United States Patent [19]

Novotny et al.

[11] 4,003,431
[45] Jan. 18, 1977

[54] PROCESS OF CEMENTING WELLS

[75] Inventors: Rudolf J. Novotny; Charles L. Smith, both of Arlington, Tex.

[73] Assignee: Byron Jackson, Inc., Long Beach, Calif.

[22] Filed: Sept. 20, 1972

[21] Appl. No.: 290,610

[52] U.S. Cl. .............................. 166/250; 23/230 R; 106/314; 259/154; 166/293

[51] Int. Cl.² ........................................ E21B 33/13

[58] Field of Search ...................... 23/203 R, 203 A; 106/314; 137/3, 93; 166/250, 293; 259/149, 154; 356/180, 181

[56] References Cited

UNITED STATES PATENTS

| 1,985,868 | 12/1934 | Maust .................. | 259/154 |
|---|---|---|---|
| 2,279,287 | 4/1942 | Chestnut et al. ................ | 259/154 |
| 2,533,852 | 12/1950 | Tietig ................. | 259/154 |
| 2,858,594 | 11/1958 | Eirich et al. ................. | 259/154 |
| 3,104,704 | 9/1963 | Kucera et al. ................ | 166/293 |
| 3,256,181 | 6/1966 | Zingg et al. ................ | 259/154 |
| 3,379,421 | 4/1968 | Putman ................. | 259/154 |
| 3,565,533 | 2/1971 | Garcia et al. ................ | 23/230 R |
| 3,615,223 | 10/1971 | Burrqughs et al. ............. | 23/230 R |
| 3,638,916 | 2/1972 | Ursic et al. ................ | 259/149 |
| 3,721,253 | 3/1973 | Remke ................. | 23/230 A |

*Primary Examiner*—Ernest R. Purser
*Assistant Examiner*—Jack E. Ebel
*Attorney, Agent, or Firm*—John O. Evans, Jr.

[57] ABSTRACT

A method of cementing oil, gas or water wells and the like, wherein a solution, dispersion, suspension, or the like of a cement additive in water is prepared at a predetermined concentration of additive and is thereafter mixed with dry powdered cement to form a cement slurry, and a sample of the additive-water mixture is analyzed prior to its being mixed with the cement, to verify that the additive-water mixture contains the desired concentration of additive. The analysis of the additive-water mixture preferably is performed continuously on a sample of the mixture in a spectrophotometer, the output signal of which may be displayed on a meter or may be used to control the relative quantities of water and additive that go into the additive-water mixture.

8 Claims, 3 Drawing Figures

4,003,431

PROCESS OF CEMENTING WELLS

BACKGROUND OF THE INVENTION

1. Field of the Invention

The present invention relates to the cementing of wells, such as oil, gas or water wells. The process of the invention may be employed in primary cementing, i.e., the cementing of casing in the well, or in secondary cementing, i.e., remedial cementing operations, such as squeeze cementing to repair leaks or seal off loss circulation or high pressure zones.

2. Description of the Prior Art

Heretofore, cement slurries for use in cementing wells have been prepared by continuously mixing a stream of dry powdered cement with a stream of water, the rates of flow of the two streams being controlled by automatic control equipment responsive to the density of the slurry to provide a cement slurry having a selected density or composition. Also, cement additives such as retarders, have been blended with dry cement which is thereafter mixed with water to form the slurry. Even small variations in the percentage of retarder or other additive in the slurry, or small variations in the distribution of the retarder in the dry cement, can greatly affect the performance of the slurry. Improper amounts of additive can lead to serious problems such as reduced thickening time, flash setting, loss of compressive strength, and others. Processes for determining the percentage of additive in the dry cement blend have been practiced. Such process is disclosed in U.S. Pat. No. 3,565,553 issued Feb. 23, 1971 to Garcia et al. In this process a tracer dye is blended with the additive and this mixture is thereafter blended with the dry cement, a test sample of the total mix being then mixed with a liquid to dissolve the dye and a spectro-photometric analysis is made to determine the percentage of the dye and thus the additive in the dry cement mix.

Another such process is disclosed in U.S. Pat. No. 3,615,223, issued Oct. 26, 1971, to James E. Burroughs et al. In this method, the distribution of the retarder in the dry ingredients of an oil well cementing composition is determined by mixing a test sample of the composition with an agent to react with or dissolve the retarder, and a spectrophotometric analysis is made to determine the percentage of the retarder in the mix.

It has also been proposed to dissolve a cement additive in water to form a solution that is thereafter mixed with dry cement to form a slurry.

SUMMARY OF THE INVENTION

An object of the invention is to provide a method of cementing pipe in a well or conducting secondary well cementing operations, wherein the percentage of additive in the slurry may be accurately controlled in a slurry-making process in which the liquid and dry ingredients of the slurry are continuously mixed, preferably under automatic control in accordance with slurry density.

Other objects will appear in or be apparent from the following description.

The invention relates to a method of well cementing which comprises: mixing water and a cement modifying additive to form an additive-water mixture having a predetermined concentration of additive therein, mixing the additive-water mixture with dry cement ingredients to form a cement slurry, pumping said cement slurry into the well, and allowing the cement slurry to set in the well, the improvement comprising, taking a sample of the additive-water mixture, and determining the concentration of the additive in the sample to verify that the additive-water mixture contains the desired predetermined concentration of additive therein.

DESCRIPTION OF THE PREFERRED EMBODIMENTS

Figure 1:
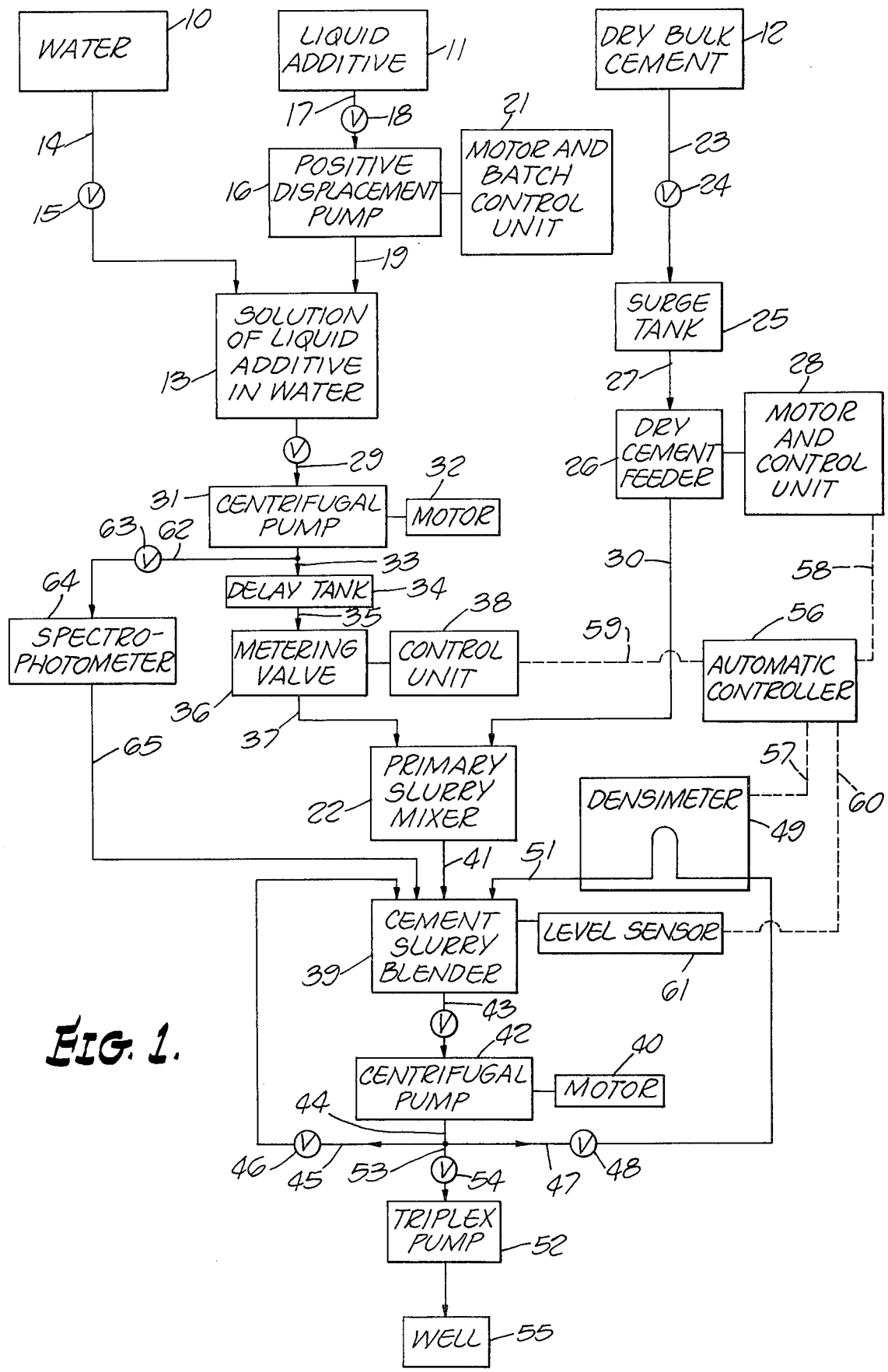
FIG. 1 is a block diagram of a system in which one form of the process of the invention may be performed.

Referring to the block diagram of FIG. 1, the reference numeral 10 denotes a source of water, the reference numeral 11 a source of liquid additive, and the reference numeral 12 a source of dry bulk cement. A mixing tank 13 is provided in which water and liquid additive are mixed to provide an additive-water mixture or solution. Water flows from the source 10 to the mixing tank 13 through a pipe 14 commanded by a valve 15. Liquid additive from the source 11 is conducted to the suction inlet of a positive displacement pump 16 through a fluid conduit 17, having therein a valve 18. The liquid additive is metered by the pump 16 into the mixing tank 13 through a pipe 19. The metering of the liquid additive by the pump 16 is under the control of a motor and batch control unit 21 that is actuated by an operator to cause the pump to deliver a predetermined quanity of liquid additive for each actuation of the control unit.

The operator can prepare a desired volume of a solution of liquid additive in water having a given concentration of additive by running water from the source 10 into the tank 13 to a calibration mark therein representing the desired volume of water, and metering into the tank 13, through the positive displacement pump 16, the calculated volume of liquid additive. The tank 13 may be equipped with an agitator to thoroughly mix solutions in the tank.

The solution of liquid additive in water from the tank 13 is mixed with dry powdered cement from the dry bulk cement source 12 in a primary slurry mixer 22, as will now be described. The primary slurry mixer may be any device for preparing cement slurries, one such device being disclosed in U.S. Pat. No. 3,542,342, issued Nov. 24, 1970, to Charles D. Barron, for "Apparatus for Mixing Pulverulent Material with Liquid."

The powdered cement is pneumatically conveyed from the source 12 through a conduit 23, having therein a control valve 24, to a surge tank 25. From the surge tank, the cement is delivered through a duct 27 to a dry cement feeder 26. The dry cement feeder may be a star wheel feeder, such as is disclosed in the foregoing Barron patent. Cement flows through a duct 30 from the dry cement feeder to the primary slurry mixer 22 at a rate that is governed by a motor and control unit 28 that drives the feeder.

The solution of liquid additive in water in the tank 13 is fed, through a valve-controlled line 29, to the suction inlet of a centrifugal pump 31, driven by motor 32. The pump sends a stream of the solution through a a pipe 33, an enclosed delay tank 34, another pipe 35, a metering valve 36, and pipe 37, to the primary slurry mixer 22, wherein the solution is mixed with the dry cement to form cement slurry. A control unit 38 adjusts the metering valve 36 to control the rate of flow of the stream of solution into the primary slurry mixer.

Reference numeral 39 indicates a cement slurry blender, which is essentially a tank, open at the top. Cement slurry from the primary slurry mixer 22 passes through the conduit 41 into the cement slurry blender 39. A centrifugal pump 42, driven by motor 40, receives cement slurry from the blender 39 by way of a valve-controlled pipe 43. The pump discharges slurry into the discharge line 44. From the discharge line, the slurry may be recirculated to the cement slurry blender 39 through a recirculation line 45 under the control of a valve 46. A portion of the slurry is conducted through a densimeter supply line 47, having a valve 48, to a densimeter 49, and thence is returned to the blender through a densimeter discharge line 51. A suitable densimeter for purposes of the present invention is disclosed in U.S. Pat. No. 3,541,863, issued Nov. 24, 1970, C.D. Barron et al., for "Densimeter and Actuator."

Cement slurry is led to the suction side of a triplex pump 52 through a line 53 under control of a valve 54, and forced by the triplex pump into the well 55. Typically, in primary cementing, the cement slurry is pumped down the well casing and up the annulus between the well casing and the well bore, and allowed to set in the annulus to cement the casing in the well. However, if desired, the cement slurry may also be applied, in accordance with known secondary cementing practices, to the cementing of liners in wells, to squeeze cementing in the repair of well defects, and to other remedial well operations.

The relative rates at which the solution of additive in water and dry cement are fed to the primary slurry mixer 22 are controlled in accordance with the density of the slurry that is produced. The output signal of the densimeter 49 is introduced into an automatic controller 56, as indicated by the dotted line 57. One output signal of the automatic controller is fed to the motor and control unit 28 for the dry cement feeder 26, as indicated by the dotted line 58. As indicated by the dotted line 59, another output signal of the automatic controller is fed to the control unit 38 for the metering valve 36 that regulates the flow of solution to the primary slurry mixer 22. The automatic controller is set, for example, to deliver solution through the metering valve 36 at a selected rate, and to regulate, responsive to the densimeter signal, the rate of flow of dry cement to the primary slurry mixer to provide a cement slurry of a given density. As control devices for carrying out the foregoing functions are well known in the art, their further description is deemed unnecessary.

A conventional level sensor 61 senses the level of the slurry in the blender 39. Its output signal is introduced into the automatic controller 56 as indicated by the dotted line 60, and serves to stop the flow of solution and cement to the primary slurry mixer when the level of the slurry in the blender reaches a preselected height.

For monitoring and control purposes, the concentration of additive in the additive-water solution is determined. Preferably, the determination is made continuously on a sample of the solution withdrawn continuously from the stream of solution flowing from the mixing tank 13 to the primary slurry mixer 22. As shown in FIG. 1, a sample pipe 62 is connected to the pipe 33 for conducting a sample of the solution through a sample control valve 63 to a spectro-photometer 64, in which the determination is continuously made. The tested sample may flow through a discharge pipe 65 into the cement slurry blender 39, to be mixed with the slurry therein, so that none of the solution is lost. However, since the volume of the sample is small compared to the total volume of solution, it may be discarded without materially affecting the composition of the cement slurry.

A preferred spectrophotometer is of the type known as "Spectronic 88," manufactured by Bausch & Lomb, 820 Linden Ave., Rochester, N.Y. 14625. This instrument is a direct reading single beam grating spectrophotometer, which provides direct linear readout of absorbance, transmittance, or concentration values using an 8 inches meter display. The wavelength range of the instrument is 325 nm. to 925 nm.

Figure 3:
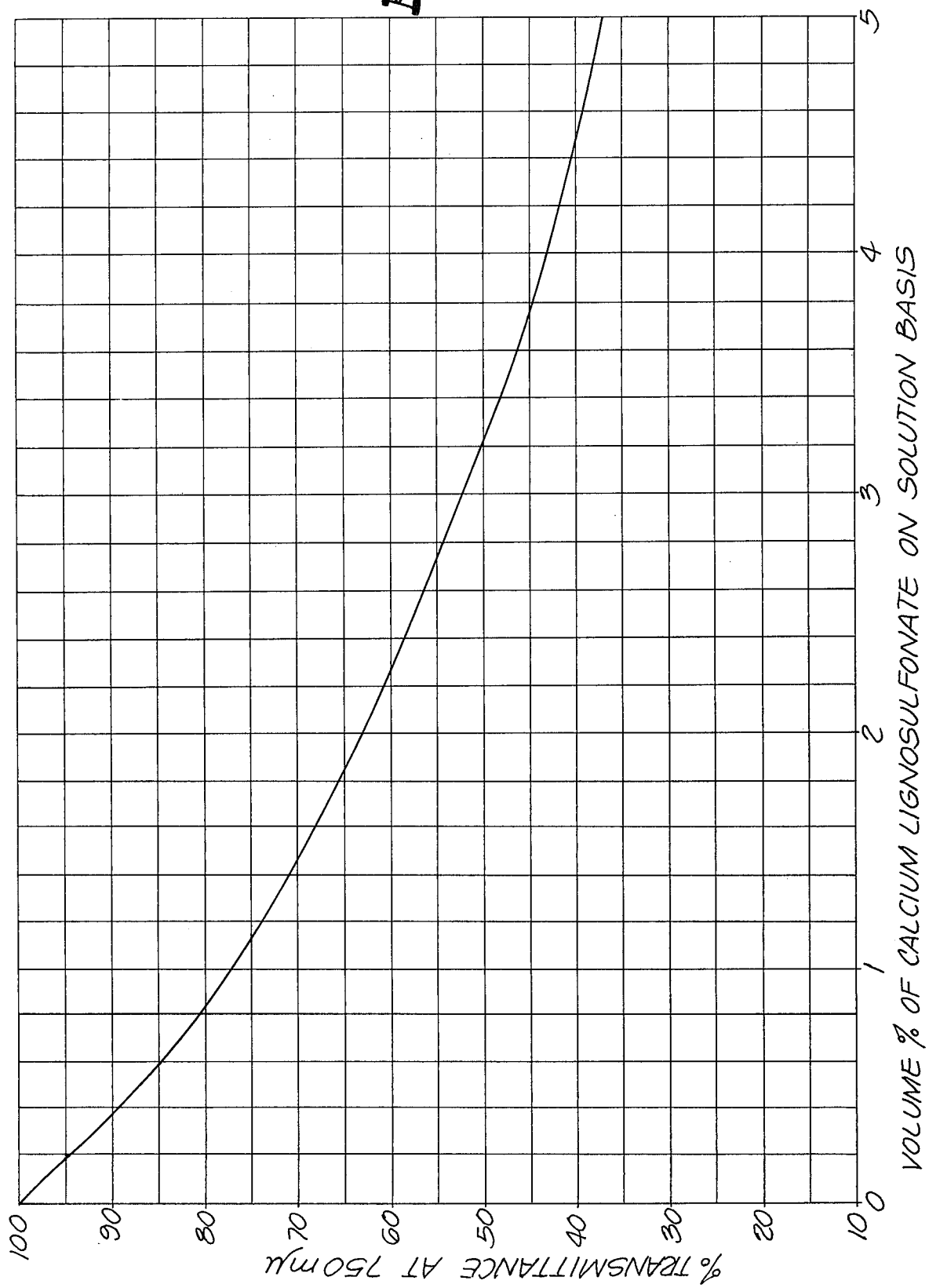
FIG. 3 is a graph representing the variation of the percentage transmittance of light by cement retarder solutions that vary in concentration, as determined with a particular type of spectrophotometer operating at a given wave length.

The curve of FIG. 3 is experimentally determined using one of the foregoing spectrophotometers. Solutions of calcium lignosulfonate, a cement retarder, in water are prepared having concentrations up to 5 volume percent of calcium ligno-sulfonate on the solution basis. Samples of these solutions are analyzed in the instrument using light having a wavelength of 750 um. or nm. The coordinates of each analysis are plotted on the chart to define the illustrated curve.

In using the instrument to determine concentration of calcium lignosulfonate in a sample of aqueous solution thereof, the percentage transmittance of the sample at 750 um. is measured, and the corresponding concentration is read from FIG. 3.

An exemplary primary cementing process is performed as follows. Calculating from measurements of the well, a volume 456 cubic feet of cement slurry is required. With a bottom hole temperature of 172° F., using class H Portland cement in a neat cement slurry having 44% water, and using calcium lignosulfonate as a retarder, it is calculated that the cement slurry should be composed of 400 sacks of class H cement, 40 gallons of calcium lignosulfonate, and 1,944 gallons of water. This mixture yields 456 cubic feet of slurry having a density of 15.9 pounds per gallon, and a thickening time of about 4 hours and 22 minutes, when pumped down the drill pipe and up into the annulus between the casing and the well bore. This cement slurry will set to produce hardened cement having a 24 hour compressive strength of about 4,288 p.s.i. at a temperature of 200° F.

Referring to FIG. 1, 1,944 gallons of water are introduced into the mixing tank 13 from the source of water 10, and 40 gallons of calcium lignosulfonate are metered into the tank 13 from the source of liquid additive 11. The calcium lignosulfonate and water in the tank are thoroughly mixed. The calculated concentration of calcium lignosulfonate in the solution is 2.02 volume percent. Referring to the chart of FIG. 3, it is seen that a solution of this concentration, if properly prepared, should give a reading of 63% transmittance at 750 um on the "Spectronic 88" instrument employed. Experience has shown that good cementing practice will tolerate a variation of plus or minus 0.1% in the concentration of the calcium ligno-sulfonate solution. Thus, it is desired, in this example, to hold the concentration of the solution between the limits of 1.92% and 2.2%, which correspond, respectively, to readings of 64% and 62% transmittance on the curve of FIG. 3.

After the solution of additive in water has been prepared in the mixing tank 13, the soulution is pumped by the centrifugal pump 31 to the primary slurry mixer 22, wherein it is mixed with the 400 sacks of class H Portland cement conveyed from the source of dry bulk cement 12, as hereinbefore described. The rates of flow of solution and dry cement are controlled to maintain the desired slurry density of 15.9 pounds per gallon as the slurry is prepared. During the making of the slurry, valve 54 may be closed, and valve 46 may be opened to achieve recirculation of the slurry and consequent uniformity. Valve 48 is also opened to allow the densimeter to control the slurry composition.

When the cement slurry has been prepared, the valve 54 is opened to deliver the slurry to the triplex pump 52 to be pumped down the well and forced into the annulus by the usual displacement fluid. The cement slurry is allowed to set in the annulus to cement the casing in the well.

In making up the slurry, the sample control valve 63 is opened and the spectrophotometer 64 is activated to continuously monitor the composition of the solution of calcium lignosulfonate in water. If the percentage transmittance of the solution registers between 62% and 64% for this particular process, the operator will know that the solution concentration is within the desired operating limits. However, should the spectrophotometer show a reading outside of these limits, the operator will know that the solution is unsatisfactory. He will then take the necessary action to correct the concentration and the volume of the solution. Such action may include the shuting down of the slurry mixing operation and the reconstitution of the aqueous solution of calcium lignosulfonate.

For the sake of simplicity in the presentation of the foregoing specific example, there has been shown in FIG. 1 but one tank 13, in which additive solution is mixed. It is contemplated, however, that two such tanks may be used where large volumes of slurry are required. Both tanks may initially be filled with solution. A first tank is used to prepare a first increment of slurry. Thereafter, the second tank is used to prepare a second increment of slurry. As the second tank is being used, a third batch of solution can be prepared in the first tank for use in making up a third increment of slurry. Thus, the tanks may be alternated to make up further increments of cement slurry, as may be needed in cementing casing in very deep wells. The spectrophotometer is employed to determine the concentration of each tank of solution as it is pumped to the primary slurry mixer, and any tank of solution that does not meet specifications may be corrected or discarded before any substantial part of it is introduced into the slurry.

Figure 2:
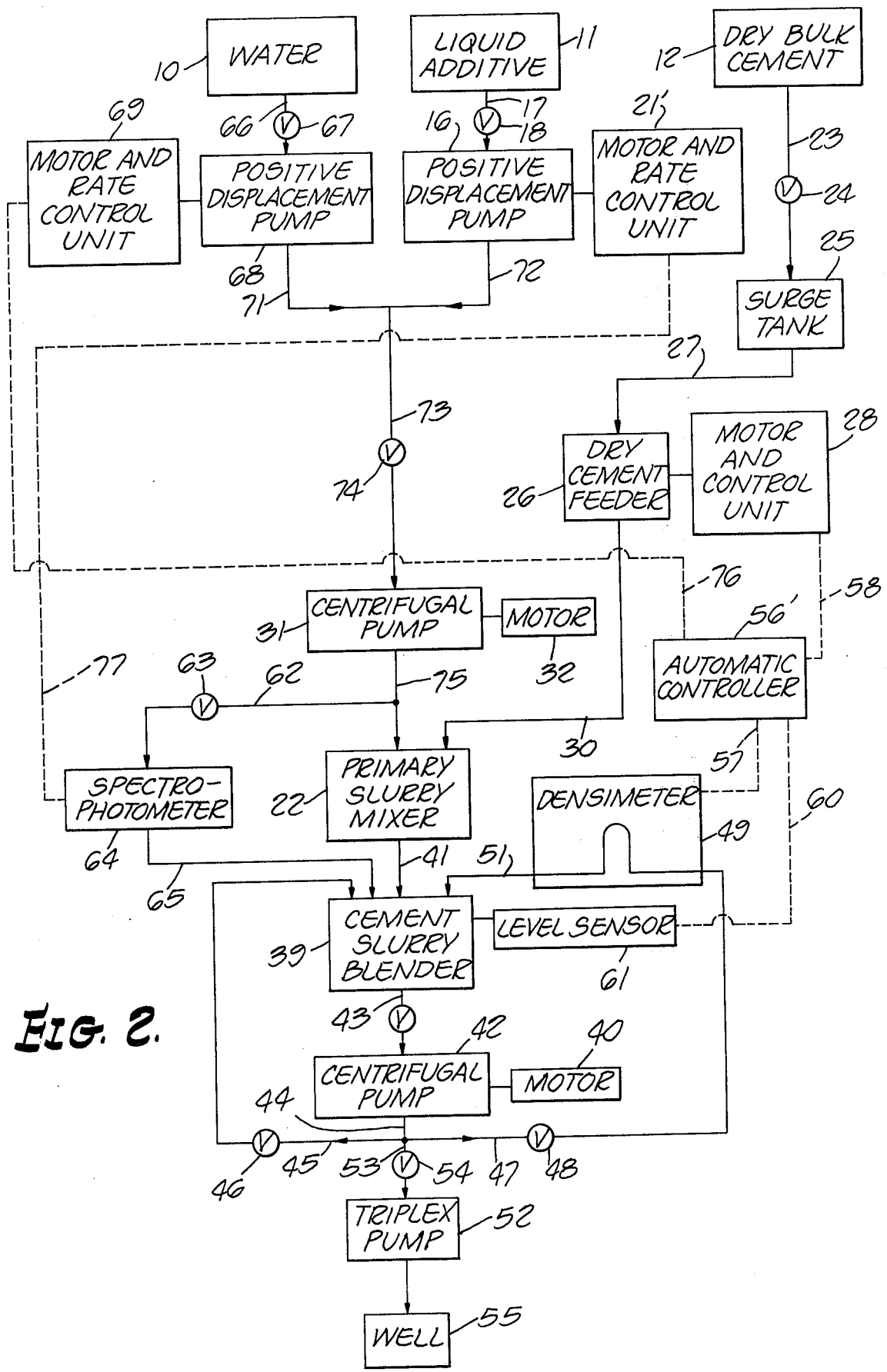
FIG. 2 is a block diagram of another system in which another form of the process of the invention may be performed.

Turning now to FIG. 2, the system shown therein is adapted to the practice of the invention in a continuous mode. In this mode, the water and liquid additive are continuously mixed, under the control of a spectrophotometer, to form a solution of liquid additive in water. This solution, as in the practice described with reference to FIG. 1, is continuously mixed with dry powdered cement to form a cement slurry, the ratio of the ingredients entering the mixture being controlled in accordance with the density of the slurry.

Since many of the components of the system of FIG. 2 are the same as the corresponding components of the system of FIG. 1, identical reference numerals are used to designate them. Components shown in FIG. 2 that are analogous but not identical to components shown in FIG. 1 are designated by corresponding primed reference numerals.

Sources of water, liquid additive, and dry bulk cement are indicated by reference numerals 10, 11 and 12, respectively. Water from the source 10 is conducted through a pipe 66 having a valve 67 to the suction inlet of a positive displacement pump 68. This pump is driven by a motor and rate control unit 69 to discharge water through the outlet pipe 71 at a controlled rate. Liquid additive from the source 11 is delivered to the suction side of another positive displacement pump 16 through a fluid conduit 17 commanded by a valve 18. The pump 16 is driven at a controlled rate by a motor and rate control unit 21' to discharge liquid additive, at a controlled rate, into the outlet pipe 72. The outlet pipes 71 and 72 merge into manifold 73 wherein the water and liquid additive are mixed. The manifold is connected to the suction inlet of a centrifugal pump 31 driven by a motor 32. A valve 74 is provided between the manifold 73 and the centrifugal pump 31. A pipe 75 conducts the solution from the centrifugal pump into the primary slurry mixer 22.

Dry bulk cement is conveyed from the source of dry bulk cement 12 to the primary slurry mixer 22 as in the practice described with reference to FIG. 1, passing en route through the surge tank 25 and the dry cement feeder 26. The cement slurry blender 39, the centrifugal pump 42, the motor 40, and the triplex pump 52 function in the same manner as the corresponding components of FIG. 1 to feed blended slurry to the well 55.

The densimeter 49 and the level sensor 61 perform functions like their counterparts in the system of FIG. 1. As indicated by the dotted line 76, the automatic controller 56' controls the motor and rate control unit 69. It may be adjusted to cause the positive displacement pump 68 to deliver water to the manifold 73 at a selected rate. The automatic controller 56' is regulated to control the motor and control unit 28 to drive the dry cement feeder 26 to deliver dry cement into the primary slurry mixer at a rate responsive to the output signal of the densimeter 49 to maintain the slurry in the blender 39 at the desired density.

A continuous sample of the liquid additive and water solution that is pumped through the pipe 75 to the primary slurry mixer 22 is passed through the sample pipe 62 to the spectrophotometer 64 wherein it is continuously analyzed for additive content. The output signal of the spectrophotometer, as indicated by the dotted line 77, is applied to the motor and rate control unit 21' in a manner to cause delivery of liquid additive from the positive displacement pump 16 to the manifold 73 at such a rate that the solution formed in the manifold contains the desired, preselected concentration of additive.

It will be seen from the foregoing description with reference to FIG. 2 that the rate of movement of water through the positive displacement pump 68 is an independent variable. The rate of movement of the liquid additive through the positive displacement pump 16, and the rate of movement of dry cement through the dry cement feeder 26 are dependent variables that are continuously regulated in accordance with the independent variable to provide a cement slurry containing the desired proportions of cement, additive and water. Of course, instead of selecting the rate of flow of the water as the independent variable, either the rate of flow of the dry bulk cement or the rate of flow of the liquid additive may be made the independent variable, with the other two rates of flow being made dependent thereon.

The foregoing description of preferred embodiments of the invention is to be considered illustrative of the invention, rather than limitative. Variations and modifications of the illustrative examples can be made without departing from the invention. Cement modifying additives other than calcium lignosulfonate may be used, such as accelerators, friction reducers, dispersants, fluid loss additives and the like either in solid or in liquid form. The additive-water mixture may take the form of a solution, a dispersion or a suspension, for example. The instrument employed to analyze the additive-water mixture is not limited to the particular instrument referred to hereinbefore, but, depending on the character of the additive-water mixture, may be a colorimeter, a turbidimeter, or the like. Radioactive or dye tracers may be mixed with the additive to serve as the basis for the analysis of the additive-water mixture. The dry cement material going into the slurry may include any of the customarily used weighting materials or other additives that change the physical or chemical character of the slurry. Any of the commonly used Portland cements can be employed and the usual waters such as fresh or sea water can be mixed therewith to form slurries in accordance with the invention. The invention is not limited to the use of the particular densimeter referred to hereinbefore but may employ other density measuring instrument.

We claim:

1. A method of cementing at a given location in a well which comprises: introducing a stream of water into a first mixing zone at a controlled rate, concurrently introducing a stream of cement-modifying additive into said first mixing zone at a controlled rate, commingling said stream of water and said stream of additive in said first mixing zone to form an additive-water mixture, flowing a stream of said additive-water mixture to a second mixing zone, introducing said stream of additive-water mixture into said second mixing zone at a controlled rate, concurrently introducing a stream of dry cement ingredients into said second mixing zone at a controlled rate, mixing said stream of additive-water mixture with said stream of cement ingredients in said second mixing zone to form a primary cement slurry, withdrawing a stream of sample of said additive-water mixture from the stream thereof flowing from said first mixing zone to said second mixing zone, continuously determining the concentration of said additive in said stream of sample, controlling the rate at which said stream of cement-modifying additive is introduced into said first mixing zone responsive to said continuously determined concentration, introducing a stream of said primary cement slurry into a cement slurry blending zone and thoroughly mixing said slurry therein to provide a reservoir of blended cement slurry, continuously measuring the concentration of dry cement ingredients in said blended cement slurry, controlling the rate at which said stream of dry cement ingredients is introduced into said second mixing zone responsive to said continuously measured concentration of dry cement ingredients, pumping said blended cement slurry from said cement slurry blending zone into said given location, and allowing said cement slurry to set in said given location.

2. A method of cementing as defined in claim 1, wherein said cement-modifying additive has color, and the concentration of additive in said stream of sample is determined spectrophotometrically.

3. A method of cementing as defined in claim 2, wherein said cement modifying additive comprises a retarder.

4. A method of cementing as defined in claim 3. wherein said retarder comprises calcium lignosulfonate.

5. A method of cementing as defined in claim 1, wherein said cement modifying additive comprises a lostcirculation additive.

6. A method of cementing as defined in claim 1, including returning said stream of sample to said cement slurry after determining the concentration of said additive therein.

7. A method of cementing as defined in claim 1, wherein said step of continuously measuring the concentration of dry cement ingredients in said blended cement slurry comprises continuously measuring the density of said blended cement slurry.

8. A method of cementing at a given location in a well which comprises: introducing a stream of water into a first mixing zone at a controlled rate, concurrently introducing a stream of cement-modifying additive into said first mixing zone at a controlled rate, commingling said stream of water and
said stream of additive in said first mixing zone to form an additive-water mixture, flowing a stream of said additive-water mixture to a second mixing zone, introducing said stream of additive-water mixture into said second mixing zone at a controlled rate, concurrently introducing a stream of dry cement ingredients into said second mixing zone at a controlled rate, mixing said stream of additive-water mixture with said stream of cement ingredients in said second mixing zone to form a primary cement slurry, withdrawing a stream of sample of said additive-water mixture from the stream thereof flowing from said first mixing zone to said second mixing zone, continuously determining the concentration of said additive in said stream of sample, controlling the rate at which one of said stream of cement-modifying additive and said stream of water is introduced into said first mixing zone responsive to said continuously determined concentration, introducing a stream of said primary cement slurry into a cement slurry blending zone and thoroughly mixing said slurry therein to provide a reservoir of blended cement slurry, continuously measuring the concentration of dry cement ingredients in said blended cement slurry, controlling the rate at which one of said stream of dry cement ingredients and said stream of additive-water mixture is introduced into said second mixing zone responsive to said continuously measured concentration of dry cement ingredients, pumping said blended cement slurry from said cement slurry blending zone into said given location, and allowing said cement slurry to set in said given location.

\* \* \* \* \*